(12) United States Patent
Holm et al.

(10) Patent No.: US 11,920,203 B2
(45) Date of Patent: Mar. 5, 2024

(54) PROCESSING OF LIGNOCELLULOSIC BIOMASS

(71) Applicant: NOVA PANGAEA TECHNOLOGIES (UK) LIMITED, Middlesbrough (GB)

(72) Inventors: Martin Spangsberg Holm, Copenhagen (DK); Aivars Zhurinsh, Riga (LV)

(73) Assignee: NOVA PANGAEA TECHNOLOGIES (UK) LIMITED, Middlesbrough (GB)

( * ) Notice: Subject to any disclaimer, the term of this patent is extended or adjusted under 35 U.S.C. 154(b) by 0 days.

(21) Appl. No.: 17/250,508

(22) PCT Filed: Jul. 15, 2019

(86) PCT No.: PCT/GB2019/051975
§ 371 (c)(1),
(2) Date: Jan. 29, 2021

(87) PCT Pub. No.: WO2020/025925
PCT Pub. Date: Feb. 6, 2020

(65) Prior Publication Data
US 2021/0310086 A1 Oct. 7, 2021

(30) Foreign Application Priority Data
Jul. 30, 2018 (GB) ...................................... 1812363

(51) Int. Cl.
*C13K 1/02* (2006.01)
*C13K 13/00* (2006.01)

(52) U.S. Cl.
CPC ................ *C13K 1/02* (2013.01); *C13K 13/00* (2013.01)

(58) Field of Classification Search
CPC ........ C13K 1/02; C13K 13/00; C13K 13/002; C08B 37/0003; C08B 37/14;
(Continued)

(56) References Cited

U.S. PATENT DOCUMENTS

| 2,022,664 A | 12/1935 | Groombridge et al. |
| 8,030,039 B1 | 10/2011 | Retsina et al. |
| 2009/0308383 A1 | 12/2009 | Shin et al. |
| 2014/0356915 A1 | 12/2014 | Retsina et al. |

(Continued)

FOREIGN PATENT DOCUMENTS

| CN | 102471759 A | * 5/2012 | ............... C12N 1/22 |
| EP | 2500466 A1 | 9/2012 | |

(Continued)

OTHER PUBLICATIONS

Machine translation of CN 102471759 A originally published May 2012 to Higgins et al. (Year: 2012).*

(Continued)

*Primary Examiner* — Sheng H Davis
*Assistant Examiner* — Ritu S Shirali

(57) ABSTRACT

Lignocellulosic biomass (11) is processed to produce organic chemicals by (a) subjecting the biomass to a first hydrolysis (14) to hydrolyse hemicellulose, to form a liquid component comprising the products of hemicellulose hydrolysis in solution, and a solid component comprising cellulose and lignin; (b) then subjecting the solid component to a second hydrolysis (20), so as to hydrolyse cellulose and vaporise the resulting products of cellulose hydrolysis; and (c) then condensing (22) the resulting vapours to form an aqueous solution (25) containing the products of cellulose hydrolysis. After the first hydrolysis (14) and before the second hydrolysis (20), the process also comprises subjecting the solid component to a washing step (16). In this washing step (16) the solid component is washed with the aqueous solution (25) that contains the products of cellulose hydrolysis. Hence the resultant solution contains the products of both the first and the second hydrolysis steps (14, 20).

9 Claims, 2 Drawing Sheets

(58) Field of Classification Search
CPC ...... C08B 37/0057; A21D 13/04; C08H 8/00; A23V 2250/00; A23V 2250/60; A23V 2250/61; A23V 2250/618; A23V 2250/638; Y02E 50/10
USPC .......................................................... 127/37
See application file for complete search history.

(56) References Cited

U.S. PATENT DOCUMENTS

| | | | |
|---|---|---|---|
| 2015/0167235 A1* | 6/2015 | Powell ................... | C08H 8/00 568/861 |
| 2015/0361616 A1* | 12/2015 | Essaddam .............. | D21C 3/003 162/73 |
| 2016/0017540 A1 | 1/2016 | Parpati et al. | |

FOREIGN PATENT DOCUMENTS

| | | | | |
|---|---|---|---|---|
| EP | 2483331 B1 | 5/2017 | | |
| WO | WO-2011039635 A2 * | 4/2011 | ............... | C08H 8/00 |
| WO | WO-2015142399 A1 * | 9/2015 | ............... | C12P 19/02 |

OTHER PUBLICATIONS

Oudenhoven et al., Demineralization of wood using wood-derived acid: Towards a selective pyrolysis process for fuel and chemicals production, 2013, Journal of Analytical and Applied Pyrolysis 103, 112-118 (Year: 2013).*

United Kingdom Intellectual Property Office, Search Report under Section 17(5) regarding Application No. GB1812363.8, dated Jan. 24, 2019, 3 pages.

International Search Report and Written Opinion regarding Application No. PCT/GB2019/051975, dated Sep. 9, 2019, 12 pages.

African Regional Intellectual Property Organization (ARIPO), Examination Report dated Jul. 21, 2022 regarding Application No. AP/P/2021/012985, 3 pages.

Intellectual Property India, Examination Report dated Aug. 31, 2022 regarding Application No. 202117007558, 6 pages.

* cited by examiner

PROCESSING OF LIGNOCELLULOSIC BIOMASS

CROSS REFERENCE TO RELATED APPLICATIONS

This application is a 371 National Stage of International Application No. PCT/GB2019/051975, filed Jul. 15, 2019, which claims priority to United Kingdom Patent Application No. GB 1812363.8, filed Jul. 30, 2018, the disclosures of which are herein incorporated by reference in their entirety.

BACKGROUND

This invention relates to a process for treating lignocellulosic biomass to produce organic chemicals, particularly but not exclusively to produce sugars.

As explained in EP 2 483 331B (Nova Pangaea), there are environmental problems that arise from the use of fossil fuels, so that use of biomass as a source for fuel and organic chemicals would be advantageous. Woody or lignocellulosic biomass is largely composed of hemicellulose, cellulose and lignin. Cellulose is principally comprised of C6 sugars while hemicellulose comprises both C5 and C6 sugars. Lignin is a complex polymer which gives physical strength to the biomass but which is tightly bound to the other components. Consequently it is not straightforward to remove the sugars from the remainder of the biomass. EP 2 483 331B teaches a method of fractionating lignocellulosic biomass by a sequence of steps. Biomass may be fed into a hemicellulose hydrolysis reactor to hydrolyse hemicellulose, so a liquid component includes the products of hemicellulose hydrolysis for example in water, and so that the remaining solid component includes cellulose and lignin. The remaining solid component is then fed to a cellulose hydrolysis reactor which may apply steam at a temperature of between about 400° and 550° C., so as to hydrolyse cellulose and vaporise the resulting sugars; and then condensing the resulting vapours. The remaining solids may be in the form of a lignin char.

EP 2 483 331B envisages the potential use of a wide range of different types of biomass, including wood, corn, straw, grass and other cellulose wastes; and indicates that the material may be pretreated for example by drying, and by comminution to create chips or flakes, indicating a preferred size of flakes being of thickness between 1 mm and 3 mm. In addition, where appropriate, the material may be pretreated to remove volatile components such as natural oils. The hemicellulose hydrolysis reactor may treat the material using steam at a temperature for example between 170° and 250° C. and at an elevated pressure for example between 10 bar(a) and 35 bar(a). These conditions are described in EP 2 483 331B as being sufficient to hydrolyse hemicellulose while minimising degradation of the biomass material. The sugars produced by hemicellulose hydrolysis will dissolve in water, and may be removed from the biomass using additional water and a counter current water flow; use of a screw press to remove liquid is also mentioned. The resulting solid material consists primarily of cellulose and lignin.

The solid material may be subjected to treatment such as drying and a further size reduction, before being subjected to a process to bring about cellulose hydrolysis. This may be achieved using flash thermolysis using superheated steam, which may for example be at a temperature between 350° and 550° C., and for example at a pressure between 1 bar(a) and 2 bar(a), such that the bond between lignin and cellulose is broken and the cellulose is hydrolysed into C6 sugars. The vaporised sugars and any other volatile compounds may then be separated from solid matter, and the vapours condensed to form an aqueous solution.

Although EP 2 483 331B describes a range of different ways of performing these steps, research has shown that there are a number of issues that must be resolved if a satisfactory yield of C5 and C6 sugars is to be obtained. For example the hemicellulose hydrolysis tends to produce organic acids such as acetic acid, and also releases alkali components such as potassium ions from the biomass. However the cellulose hydrolysis step will produce a good yield of C6 sugars (or related compounds) only in the absence of significant quantities of alkali; if significant quantities of alkali or inorganic acid are present then the cellulose hydrolysis tends to produce smaller molecules such as C1 to C3 aldehydes and ketones, and gases such as carbon monoxide and carbon dioxide. It is therefore necessary to wash or rinse the solid material output from the hemicellulose hydrolysis step, to remove the alkali materials as well as most of the inorganic acid. This washing or rinsing step has the further benefit of removing any remaining soluble hydrolysis products such as C5 or C6 sugars, which would otherwise be destroyed in the subsequent thermolysis step.

It will be appreciated that the chemical processes that take place when performing the operation referred to as "cellulose hydrolysis" may be more accurately referred to as thermolysis, pyrolysis, depolymerisation or degradation; the overall result is that cellulose is separated from lignin and is broken down into smaller compounds. In this document the process of treating the material with high temperature steam to create smaller compounds from the cellulose is referred to as cellulose hydrolysis, which is in conformity with the terminology used in EP 2 483 331.

SUMMARY

According to the present invention there is provided a process for treating lignocellulosic biomass to produce organic chemicals, the process comprising:
(a) subjecting the biomass to a first hydrolysis to hydrolyse hemicellulose, to form a liquid component comprising the products of hemicellulose hydrolysis in solution, and a solid component comprising cellulose and lignin;
(b) then subjecting the solid component to a second hydrolysis, so as to hydrolyse cellulose and vaporise the resulting products of cellulose hydrolysis; and
(c) then condensing the resulting vapours to form an aqueous solution containing the products of cellulose hydrolysis;
wherein, after the first hydrolysis and before the second hydrolysis, the process also comprises subjecting the solid component to a washing step, wherein the solid component is washed with the aqueous solution that contains the products of cellulose hydrolysis.

The first hydrolysis would typically be performed at a significantly lower temperature than the second hydrolysis. For example the first hydrolysis may be at a temperature no higher than 250° C., whereas the second hydrolysis may be at a temperature above 350° C. Furthermore the pressure may be different for these two processes, as may the residence times.

In one embodiment, acid such as sulphuric acid is added to the biomass before it is subjected to the first hydrolysis. It has been found that the hemicellulose hydrolysis step is more effective if an acid is present, and can be carried out at a somewhat lower temperature, for example no higher than 180° C. To some extent the hemicellulose hydrolysis reaction may be autocatalytic, because of formation of organic acids such as acetic acid. Nevertheless the addition of an acid prior to starting the first hydrolysis is beneficial in ensuring satisfactory hydrolysis at a lower temperature than would otherwise be required.

After the washing step, and before the second hydrolysis step, the solid component may be dried. This drying step will evaporate excess moisture.

It will be appreciated that the washing step removes water-soluble inorganic and organic acid and alkali material from the solid component, and also removes the products of hemicellulose hydrolysis that are in solution. It therefore produces washed solid component which can then be subjected to the second hydrolysis to form C6 sugars (rather than C1 to C3 aldehydes and ketones, and permanent gases). The liquid mixture formed as a result of the washing step contains the soluble products of hemicellulose hydrolysis, which are predominantly C5 sugars (such as xylose), with some C6 sugars (such as glucose and mannose), along with the products of the second hydrolysis, which are predominantly C6 sugars. Consequently the liquid mixture has a significantly higher total sugar content than would be achieved if the washing step had just used clean water.

After washing with the solution that contains the products of cellulose hydrolysis, the solid component may be subjected to a second washing step using clean water to remove residual sugars. This second washing step minimises the sugar that remains in the solid component and is then subjected to the second hydrolysis, which is beneficial as the sugar would predominantly be broken down as a result of the second hydrolysis. The volume of water used in this second washing step is much less than the volume of the aqueous solution that contains the products of cellulose hydrolysis and that was used for the initial washing step, so that the final concentration of sugars is not significantly reduced by this second washing step.

The products of cellulose hydrolysis are referred to above as C6 sugars, but in practice consist of a mixture which may for example contain glucose, levoglucosan, levoglucosenone, oligomeric anhydrosugars, sugar oligomers and sugars chemically bound to phenol derivatives. The proportions may depend on the exact chemical composition of the solid component that is being treated, and the type of acid present. The cellulose hydrolysis (or thermolysis) principally produces the volatile compound anhydroglucose, which may be referred to as levoglucosan. If the intention is to produce a sugar solution that can be fermented, it may be beneficial to treat this C6 sugar mixture with aqueous acid, which will have the effect for example of converting levoglucosan to glucose. In the present invention the products of cellulose hydrolysis, in solution, are used to wash out the inorganic acid and the alkali materials in addition to the soluble products of hemicellulose hydrolysis, and the resultant sugar solution is somewhat acidic. Thus the process enables the inorganic acid used in the hemicellulose hydrolysis to then be used to enhance the conversion of levoglucosan to glucose after the washing step. Hence the acid is effectively used twice, which may make it possible to reduce the total amount of inorganic acid required for the overall process.

BRIEF DESCRIPTION OF THE DRAWINGS

The invention will now be further and more particularly described, by way of example only, and with reference to the accompanying drawings in which.

DETAILED DESCRIPTION

Figure 1:
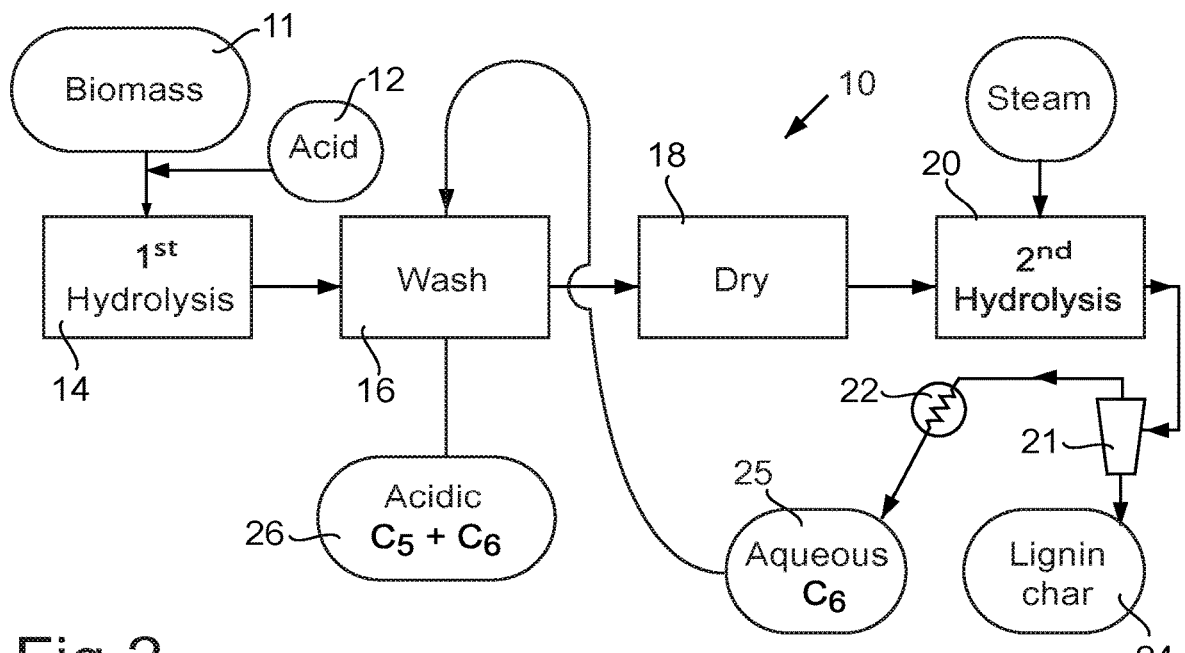
FIG. 1 shows a flow diagram for the process of the invention.

Referring to FIG. 1, the present invention provides a process 10 for treating biomass 11 such as wood chips so as to obtain C5 and C6 sugars by breaking down the hemicellulose and cellulose polymers within the biomass. The process uses two different hydrolysis steps that are performed at different temperatures, and may also be carried out at different pressures. However, prior to performing the hydrolysis steps the biomass may be chopped into small pieces, and may be heated to evaporate vapours for example of naturally-occurring oils such as turpentine or eucalyptus oil if these are present in significant concentration.

After performing any such pre-treatment, the biomass is impregnated 12 with a strong acid, for example with dilute sulphuric acid (i.e. about 1 mole/L) typically at a rate of between 1-2 wt % of the dry biomass, before being introduced by a screw conveyor into a reactor 14 in which the biomass is contacted with steam/water at a temperature of between 150° and 180° C. and a pressure of between 6 bar and 10 bar, for example at 165° C. and a pressure of 6.5 bar (gauge); there is little air present. This may be a tube reactor along which the biomass travels along with the high-pressure steam/water. Under these reaction conditions the hemicellulose breaks down mainly to form C5 sugars, with also some C6 sugars, and organic acids, depending on the inherent composition of the biomass being processed.

At the operating pressure of 6.5 bar, the water at 165° C. is liquid as long as the pressure is maintained. As the material leaves the reactor 14 it may be cooled by allowing it to depressurise, so that a proportion of the water evaporates, typically about 10%, cooling the remaining biomass to below 100° C. For example the mixture of biomass and hot water may be released in slugs from the reactor. As mentioned above, it is necessary to remove the liquid phase from the treated biomass before it can be subjected to the second hydrolysis step, both to remove sugars and to remove alkali material and any inorganic acid. Although some of the liquid may be removed by compression, this doesn't enable all the liquid to be expelled. It is therefore preferable to remove the liquid phase by a washing step.

The solid material that has been subjected to the hydrolysis step in the reactor 14 is therefore then washed at step 16, which is described in more detail below.

The washed material is then dried at step 18 to evaporate excess moisture, and may be further comminuted (not shown) to ensure all the particles small enough to heat up quickly. The material is then introduced, for example with a screw conveyor, into a reactor 20 in which the solid material is contacted with superheated steam at a significantly higher temperature, for example 550° C. The particles of solid material cool the superheated steam while themselves being heated up. By way of example the material may be fed into a flow of superheated steam at for example 550° C., flowing along a tube substantially in the absence of air, so that the particulate material is carried along with the superheated steam and so effectively subjected to a temperature in the range for example 380° to 410° for a short period which may for example be between 0.5 seconds and 5 seconds. Under these reaction conditions the cellulose undergoes degradation or hydrolysis, mainly producing C6 sugar derivatives which are volatile under these conditions. At the end of the tube the particulate material, which at this stage is a solid lignin char 24, may be separated from the vapours and gases by passing through a cyclone 21, and the vapours then condensed by passage through a heat exchanger 22 (or through a series of heat exchangers 22).

The condensed vapours create an output stream 25 which is an aqueous solution of the products of degradation or hydrolysis of the cellulose, which will primarily consist of C6 sugars, typically in an anhydrous form. For example the products of hydrolysis may be anhydroglucose (which is also called levoglucosan), but there may also be phenolic-substituted glucose, and phenolic-substituted anhydrosugars as well as oligomeric anhydrosugars and sugar oligomers.

In accordance with the present invention this output stream 25 of condensed vapours from the cellulose hydrolysis reactor 20 is fed back, and used for the washing step 16. Thus the products of the hemicellulose hydrolysis, alkali, and any resultant organic acids, and at least the bulk of the added inorganic acid, are washed out of the solid material in this washing step 16. The resulting aqueous solution 26 therefore contains the C5 sugars produced during hemicellulose hydrolysis, and also the C6 sugars produced during cellulose hydrolysis, and at least the latter may be in an anhydrous form. The aqueous solution also contains the bulk of the acid added at step 12 before the biomass was treated in the hemicellulose hydrolysis reactor 14.

This somewhat acidic aqueous solution 26 containing C5 and C6 sugars may be the final product of the process 10.

Figure 2:
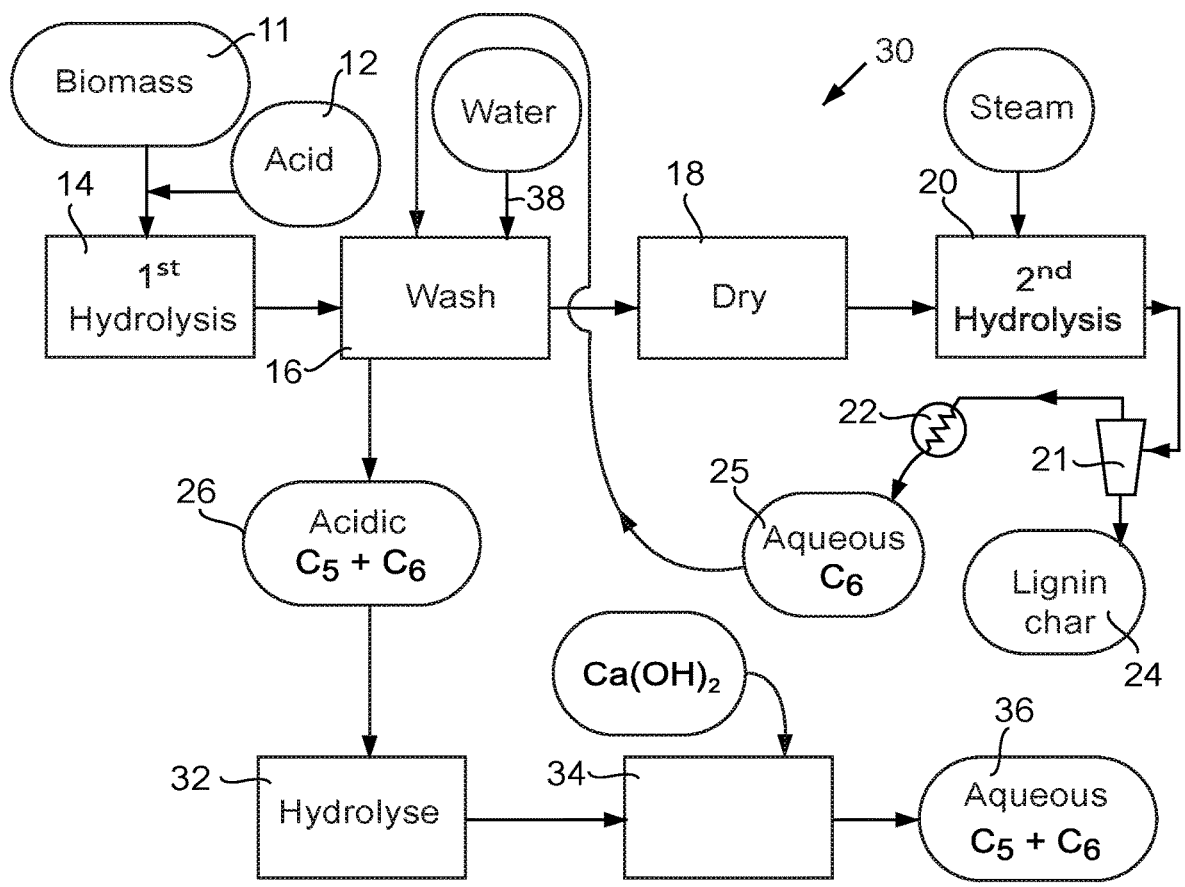
FIG. 2 shows three modifications to the flow diagram of FIG. 1.

Referring now to FIG. 2, this shows three modifications to the process 10 of FIG. 1, and any one or more of these modifications may be used. The process 30 of FIG. 2 illustrates the use of all three modifications; in all other respects the processes 10 and 30 are the same, and the same reference numbers are used.

In one modification, the somewhat acidic solution 26 is then heated, at step 32, typically to about 120° C. for 30 minutes, to ensure that the anhydrous sugars are hydrolysed. This hydrolysis of the anhydrous sugars is catalysed by the presence of the inorganic acid. Additional acid may be added to the somewhat acidic solution 26 if required. The anhydroglucose (predominantly, levoglucosan) and any phenolic-substituted glucose, oligomeric anhydrosugars and sugar oligomers are thereby converted to glucose.

In a second modification, the remaining acid may be neutralised by adding, at step 34, a base, for example slaked lime (calcium hydroxide), to obtain a substantially neutral pH, i.e. pH 7, so that the overall process produces a neutral aqueous sugar solution 36 which contains both C5 (hemicellulosic) and C6 sugars, and is not acidic. This step 34 may be carried out after performing the hydrolysis step 32, or if there is no requirement to hydrolyse the anhydrous sugars, then the step 34 of adding the base may be applied to the somewhat acidic solution 26, without performing the hydrolysis step 32.

It will be appreciated that after the solid material has been washed, at step 16, using the aqueous C6 sugar solution, that is to say the output stream 25, some of that C6 sugar solution will remain within or in contact with the solid material. Such remaining sugar is likely to be destroyed during the high temperature cellulose hydrolysis step 20. Hence, in a third modification, after washing the solid material using the aqueous C6 sugar solution 25, it may be advantageous to subject the solid material to a further wash or rinse with clean water (indicated by reference 38), to wash out the residual C6 sugars. This may be demineralised water. The sugar solution obtained through this further washing or rinsing step 38 is combined with the somewhat acid solution 26. The volume of clean water used for this further washing or rinsing step 38 should be significantly less than the volume of the aqueous C6 sugar solution, that is to say the output stream 25, used for the initial washing step 16, so the concentration of sugar in the somewhat acidic aqueous solution 26 is not significantly reduced by the addition of the clean water.

It will be appreciated that the process 10 or 30 of the present invention combines the C5 sugar solution produced by the hemicellulose hydrolysis 14 with the C6 sugar solution produced by the cellulose hydrolysis 20. This has the advantage that the anhydrous C6 sugars produced in the cellulose hydrolysis step 20 can readily be hydrolysed to the hydrous C6 sugars, because most or all of the acid that would conventionally be required to catalyse this hydrolysis is already present in the C5 sugar solution. Thus the inorganic acid which is added at 12 to the biomass to enhance the first hydrolysis step 14 is subsequently made use of to perform the subsequent hydrolysis step 32. The acid is thereby made use of twice, so less acid is required in total, and less basic material is required to neutralise the acid.

Figure 3:
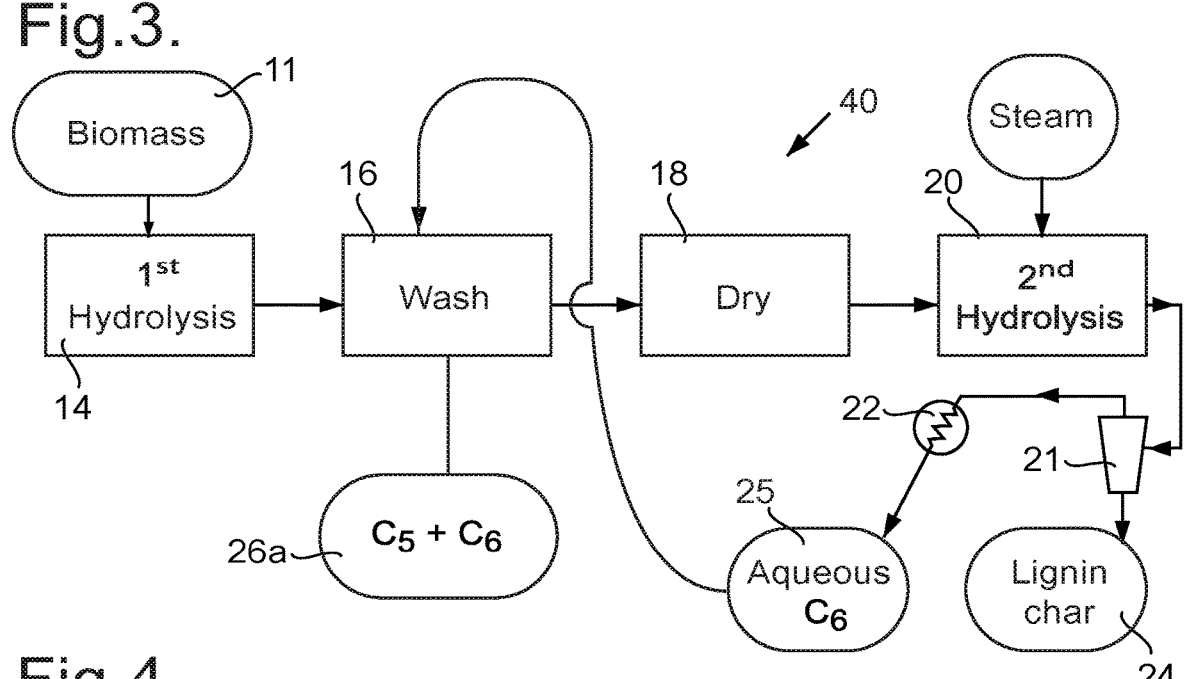
FIG. 3 shows an alternative modification to the flow diagram of FIG. 1.

Referring now to FIG. 3, this shows an alternative process 40 which is a modification to the process 10 of FIG. 1, in which the same reference numerals are used to refer to the same features. The process 40 differs from the process 10 in that no inorganic acid is added to the biomass 11 before performing the first hydrolysis step in the hydrolysis reactor 14. It may therefore be necessary to operate the hydrolysis reactor 14 at a higher temperature and pressure than described above in relation to the process 10. The washing step 16, the drying step 18 and the operation of the cellulose hydrolysis reactor 20 are performed in the same way as described above. One consequence of operating in this way is that the aqueous solution 26a produced from the washing step 16 contains the C5 and C6 sugars produced by the hydrolysis of hemicellulose and also the anhydrous C6 sugars produced by the hydrolysis of cellulose, as described above, but that the aqueous solution 26a is not acidic. This aqueous solution 26a may be the output product of the process 40.

If it is necessary to hydrolyse the products of the cellulose hydrolysis reactor 20 to form sugars, this may be achieved by adding an inorganic acid to the solution 26a, and then performing hydrolysis by a heating step 32, and optionally also a neutralisation step 34, as described above in relation to FIG. 2. Furthermore the process 40 may also be modified to incorporate the additional wash or rinse with clean water 38 as described above in relation to FIG. 2.

Figure 4:
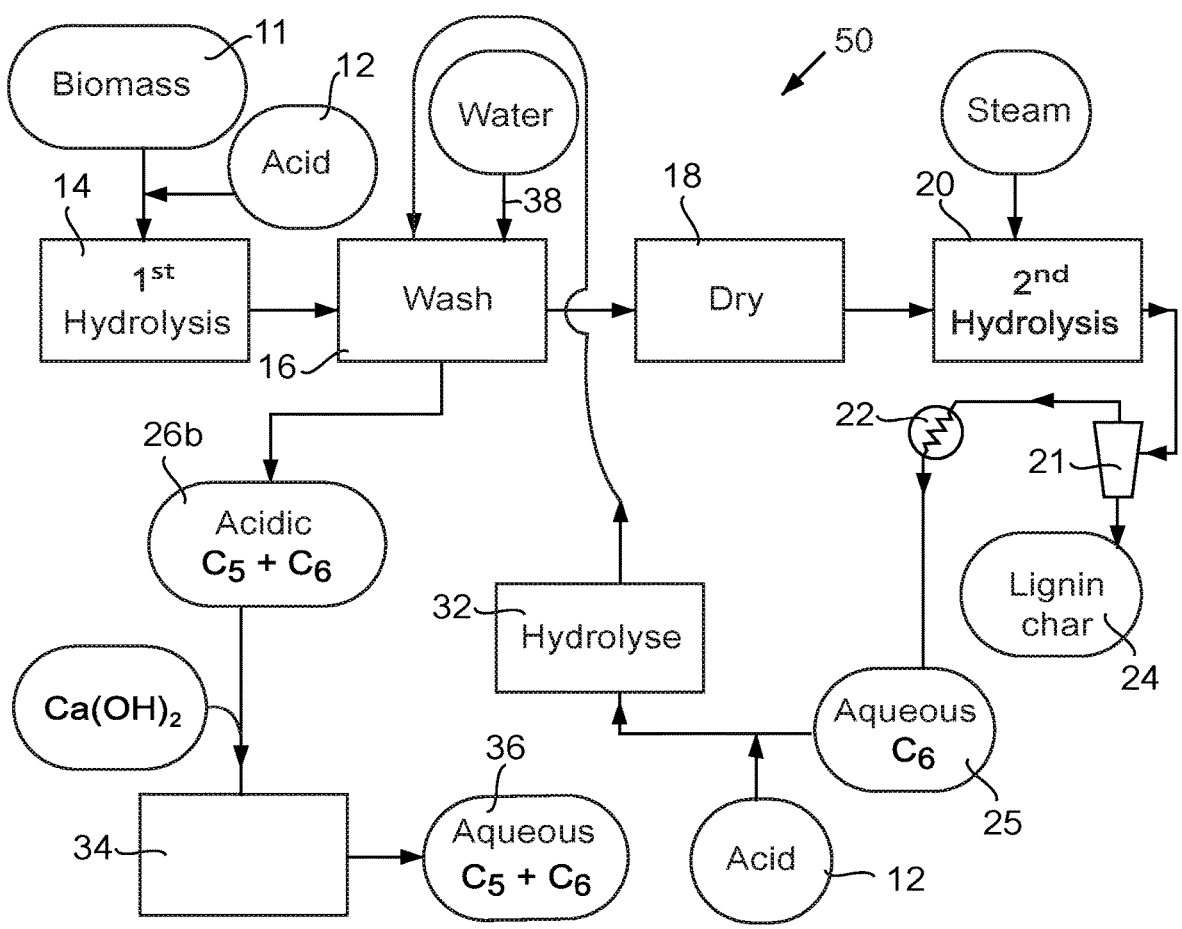
FIG. 4 shows a modification to the flow diagram of FIG. 2.

Referring now to FIG. 4, this shows a process 50 which is a modification to the process 30 of FIG. 2, in which the same reference numerals are used to refer to the same features. The process 50 differs from the process 30 in that an inorganic acid 12 is added to the output stream 25 that is the aqueous solution of the products of degradation or hydrolysis of the cellulose, output from the reactor 20, and the resulting acidified solution is heated at step 32, typically to about 120° C. for 30 minutes, to ensure that the anhydrous sugars are hydrolysed. Then, as in the processes 10, 30 and 40, the solution is used in the washing step 16. Consequently the liquid outflow from the washing step 16 is a somewhat acidic solution 26b which contains both C5 sugars and C6 sugars which are already in their hydrolysed form. This aqueous solution 26b may be the output product of the process 50.

If a neutral solution of C5 and C6 sugars is required, this may be achieved by adding, at step 34, a base, for example slaked lime (calcium hydroxide), to obtain a substantially neutral pH, i.e. pH 7, so that the overall process 50 produces a neutral aqueous sugar solution 36 which contains both C5 and C6 sugars.

In a modification to the process 50, the solution output from the hydrolysing heating step 32 may be subjected to a neutralisation step equivalent to step 34 before being used to perform the washing step 16. This modification is not shown.

A further benefit that the invention provides is that the output stream 25 of condensed vapours from the cellulose hydrolysis reactor 20 may contain phenolic compounds, in addition to the C6 sugars. As a general rule these phenolic compounds are not required or useful in the resultant sugar solution 26. The washing step 60 brings the output stream 25 into intimate contact with the solid material, and it is surmised that much of these phenolic compounds will be absorbed onto the solid material, rather than being carried through into the resultant sugar solution 26.

The following Examples show the effect of the washing step 16 on the performance of the process.

Example 1

Birch wood that had been subjected to the first hydrolysis step 14, and so containing the monomerized hemi-cellulosic sugars as well as the sulphuric acid used to catalyze the hemicellulose hydrolysis, was washed either three times with the aqueous output stream 25 of condensed vapours from the cellulose hydrolysis reactor 20, and subsequently once with pure demineralised water or four times with pure demineralised water. A mass ratio of approximately 1:2 (wet pretreated material:liquid stream 25) was used in each washing step. The washed material was isolated by filtration as part of each washing step.

The two washed materials were dried and subjected to the cellulose hydrolysis step 20 at 400° C. in the presence of superheated steam as described above.

As shown in Table 1 a total sugar yield of 32.1% was obtained from the cellulose hydrolysis step 20 (pyrolysis) of the material washed four times with pure demineralized water. Surprisingly the yield obtained from the cellulose hydrolysis step 20 (pyrolysis) of material washed three times with the aqueous output stream 25 and then once with water was practically identical at 31.1%.

TABLE 1

Total sugar yield from pyrolysis of pretreated material washed with demineralized water, or with the aqueous stream 25 and demineralised water.

|  | Total sugars yield from pretreated material in pyrolysis (%) |
|---|---|
| Pretreated material washed 4 times with pure water | 32.1 |
| Pretreated material washed 3 times with aqueous stream 25 (pyrolysis condensate) and once with pure water | 31.1 |

Example 2

Birch wood that had been subjected to the first hydrolysis step 14, and so containing the monomerized hemi-cellulosic sugar as well as the sulphuric acid used to catalyze the hemicellulose hydrolysis, was washed three times with fresh pyrolysis condensate (i.e. the aqueous stream 25) and subsequently two times with pure demineralized water. Solid-liquid separation after each wash was done by vacuum filtration. The second hydrolysis step 20 (pyrolysis) of the washed material was carried out on samples taken after each washing step, to examine the feasibility of using the aqueous output stream 25 (pyrolysis condensate) as washing medium instead of using solely pure demineralized water. A mass ratio of 1:2 (wet pretreated material:pyrolysis condensate) was used in each washing step.

The pyrolysis condensate (i.e. the aqueous stream 25) contains no sulphuric acid and hence the sulphuric acid concentration in the filtrate liquid 26 is a good indicator of residual sulphuric content in the washed solid material. The sulphuric acid content in the filtrate liquid after each successive washing step is shown in Table 2 below. It can be seen that the sulphuric acid wt. % decreases as a function of consecutive washes and over three washing steps with fresh pyrolysis condensate the sulphuric acid content drops from 0.21 wt. %, to 0.08 wt. %, and then to 0.05 wt. %. A subsequent wash with pure water brings the sulphuric acid concentration of the filtrate below 0.01 wt. %.

TABLE 2

Sulphuric acid content in filtrate liquid as a function of washing.

| Filtrate No. | Sulphuric acid content in filtrate (wt. %) |
|---|---|
| Pyrolysis condensate washes | |
| $1^{st}$ | 0.21 |
| $2^{nd}$ | 0.08 |
| $3^{rd}$ | 0.05 |
| Water washes | |
| $4^{th}$ | <0.01 |
| $5^{th}$ | <0.01 |

Table 3 shows the yield of levoglucosan obtained from the second hydrolysis step 20 (pyrolysis) of the solid material washed either 3 times with condensate, 3 times with condensate and once with pure demineralised water or 3 times with condensate and twice with pure demineralised water, respectively. The yield is given in relative carbon % of all the gaseous products formed.

TABLE 3

Pyrolysis yields of levoglucosan as a function of washing

| Solid product after washing | Levoglucosan yield (relative yield in % from GC analysis) |
|---|---|
| $3^{rd}$ washing (3× pyrolysis condensate) | 39.0 |
| 4th washing (3× pyrolysis condensate + 1× pure water) | 39.9 |
| 5th washing (3× pyrolysis condensate + 2× pure water) | 21.1 |

The second hydrolysis step 20 (pyrolysis) if carried out on material which contains significant amounts of sulphuric acid, such as unwashed material or material washed only once with either water or pyrolysis condensate, will lead to low yields of levoglucosan (<20%). Surprisingly, it can be seen from Table 3 that the yield of levoglucosan after washing three times solely with the aqueous stream 25 (i.e. pyrolysis condensate), which is 39.0%, is practically identical with the levoglucosan yield obtained after washing three times with the aqueous stream 25 (pyrolysis condensate) and subsequently once with pure demineralised water (39.9%). The yield did not increase further if the material was washed further with pure water and indeed the yield actually dropped to 21.1% if the material was given a second wash with demineralised water. This suggests that the material can be washed too much; this may be because low residual levels of sulphuric acid are beneficial to the formation of levoglucosan in the second hydrolysis step 20.

The invention claimed is:

1. A process for treating lignocellulosic biomass to produce organic chemicals, the process comprising:
   (a) subjecting the lignocellulosic biomass to a first hydrolysis at a temperature no higher than 250° C. to hydrolyse hemicellulose, to form a liquid component comprising the products of hemicellulose hydrolysis in solution, and a solid component comprising cellulose and lignin;
   (b) then subjecting the solid component to a second hydrolysis at a temperature above 350° C., so as to hydrolyse cellulose and vaporise the resulting products of cellulose hydrolysis; and
   (c) then condensing the resulting vapours to form an aqueous solution containing the products of cellulose hydrolysis,
   wherein, after the first hydrolysis and before the second hydrolysis, the process also comprises a plurality of first washing steps, wherein during each of the plurality of first washing steps, the solid component is washed with the aqueous solution containing the products of cellulose hydrolysis, to separate the said liquid component from the solid component and produce a resultant aqueous sugar solution comprising the products of hemicellulose hydrolysis and the products of cellulose hydrolysis, the process further comprising a second washing step subsequent to the plurality of first washing steps, in which the solid component is washed using demineralized water to remove residual sugars produced by washing the solid component with the aqueous solution containing the products of cellulose hydrolysis in the first washing steps,
   wherein the volume of water used in the second washing step is less than the volume of the aqueous solution containing the products of cellulose hydrolysis and that was used for each of the plurality of first washing steps.

2. The process as claimed in claim 1, wherein, after the second washing step and before the second hydrolysis, the process also comprises subjecting the solid component to a drying step.

3. The process as claimed in claim 1, wherein a strong acid is added to the lignocellulosic biomass before it is subjected to the first hydrolysis.

4. The process as claimed in claim 3, wherein the strong acid is sulphuric acid or phosphoric acid.

5. The process as claimed in claim 1, wherein the resultant aqueous sugar solution is subjected to a heating step to ensure hydrolysis of any anhydrous sugar compounds produced by cellulose hydrolysis.

6. The process as claimed in claim 1, wherein a basic material is added to the resultant aqueous sugar solution, to neutralise remaining acid.

7. The process as claimed in claim 1, wherein the aqueous solution containing the products of cellulose hydrolysis is hydrolysed to glucose before being used in the washing step.

8. The process as claimed in claim 7, wherein the aqueous solution containing the products of cellulose hydrolysis, after being hydrolysed to glucose, is then neutralized before being used in the washing step.

9. The process as claimed in claim 1, wherein there are three said first washing steps.

* * * * *